United States Patent
Sakaida

(10) Patent No.: US 9,792,126 B2
(45) Date of Patent: Oct. 17, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventor: Hiroshi Sakaida, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 96 days.

(21) Appl. No.: 14/594,355

(22) Filed: Jan. 12, 2015

(65) Prior Publication Data

US 2016/0062772 A1    Mar. 3, 2016

(30) Foreign Application Priority Data

Sep. 3, 2014  (JP) ................................. 2014-178749

(51) Int. Cl.
  *G06F 9/00* (2006.01)
  *G06F 15/177* (2006.01)
  *G06F 9/44* (2006.01)
  *G06T 1/60* (2006.01)

(52) U.S. Cl.
  CPC .......... *G06F 9/4401* (2013.01); *G06F 9/4411* (2013.01); *G06T 1/60* (2013.01); *G06T 2200/28* (2013.01)

(58) Field of Classification Search
  CPC ... G06F 9/4401; G06F 9/4411; G06T 2200/28
  See application file for complete search history.

(56) References Cited

U.S. PATENT DOCUMENTS

| 6,118,547 A * | 9/2000 | Tanioka | H04N 1/40087 358/1.9 |
| 2004/0260919 A1 * | 12/2004 | Takahashi | G06F 9/4401 713/2 |
| 2007/0146487 A1 * | 6/2007 | Iguchi | H04N 1/3875 348/207.2 |

(Continued)

FOREIGN PATENT DOCUMENTS

| JP | 2008-287317 A | 11/2008 |
| JP | 2008-293321 A | 12/2008 |

*Primary Examiner* — Mohammed Rehman
*Assistant Examiner* — Gayathri Sampath
(74) *Attorney, Agent, or Firm* — Sughrue Mion, PLLC

(57) ABSTRACT

An information processing apparatus includes a first boot unit, a first image display, a second boot unit, a second image display, a memory, and an image processing unit. The first boot unit boots the information processing apparatus. The first image display performs image display while the first boot unit boots the information processing apparatus. The second boot unit boots the information processing apparatus. The second image display performs image display while the second boot unit boots the information processing apparatus. The memory stores image information. The image processing unit performs image processing on the image information. The first image display performs the image display based on the image information stored in the memory. The second image display performs the image display based on the image information image-processed by the image processing unit.

4 Claims, 2 Drawing Sheets

(56) References Cited

U.S. PATENT DOCUMENTS

| | | | |
|---|---|---|---|
| 2010/0325409 A1* | 12/2010 | Kim | G06F 9/4401 |
| | | | 713/2 |
| 2014/0068240 A1* | 3/2014 | Nightingale | G06F 9/44557 |
| | | | 713/2 |
| 2014/0181497 A1* | 6/2014 | Dominicus | G06F 8/65 |
| | | | 713/2 |

\* cited by examiner

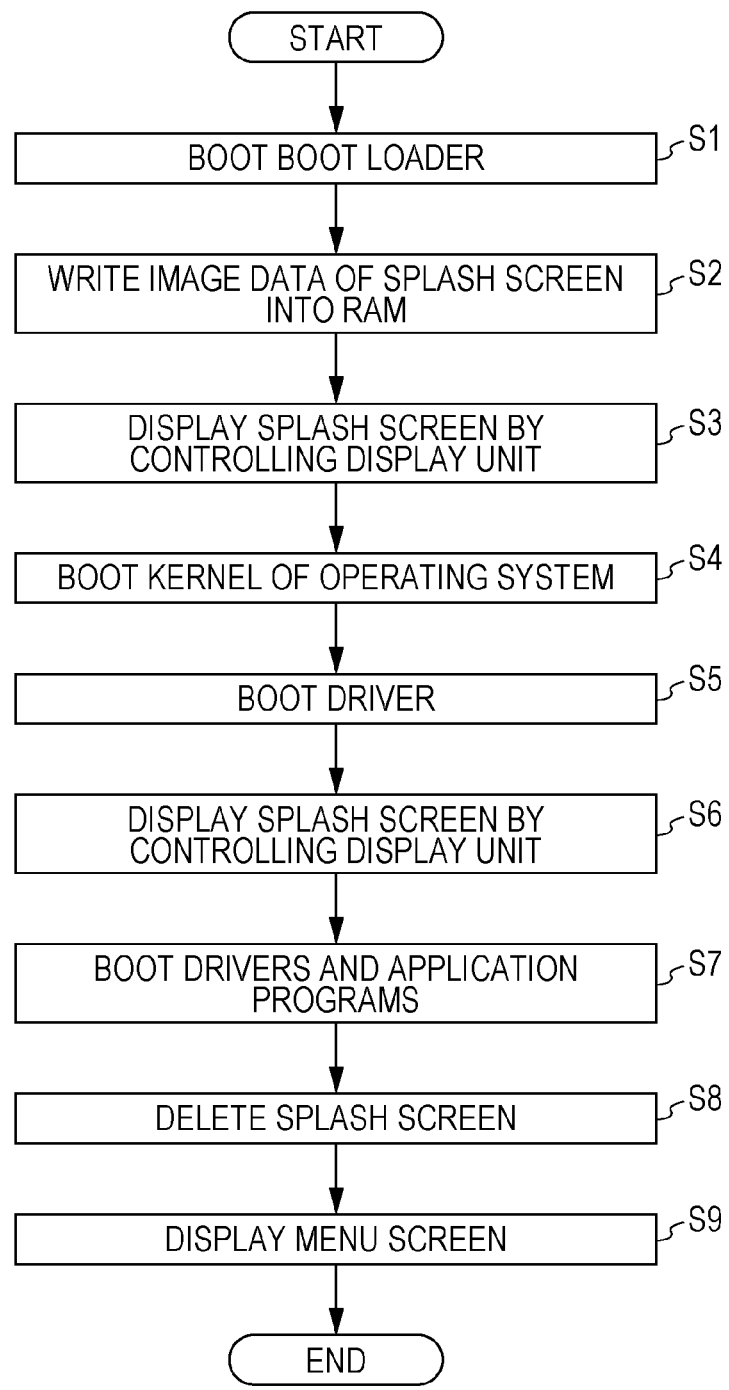

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-178749 filed Sep. 3, 2014.

BACKGROUND

Technical Field

The present invention relates to information processing apparatuses, information processing methods, and non-transitory computer readable media.

SUMMARY

According to an aspect of the invention, there is provided an information processing apparatus including a first boot unit, a first image display, a second boot unit, a second image display, a memory, and an image processing unit. The first boot unit boots the information processing apparatus. The first image display performs image display while the first boot unit boots the information processing apparatus. The second boot unit boots the information processing apparatus. The second image display performs image display while the second boot unit boots the information processing apparatus. The memory stores image information. The image processing unit performs image processing on the image information. The first image display performs the image display based on the image information stored in the memory. The second image display performs the image display based on the image information image-processed by the image processing unit.

BRIEF DESCRIPTION OF THE DRAWINGS

An exemplary embodiment of the present invention will be described in detail based on the following figures, wherein:

FIG. 3 is a flowchart illustrating the flow of processing performed by a central processing unit.

DETAILED DESCRIPTION

Exemplary Embodiment

Figure 1:
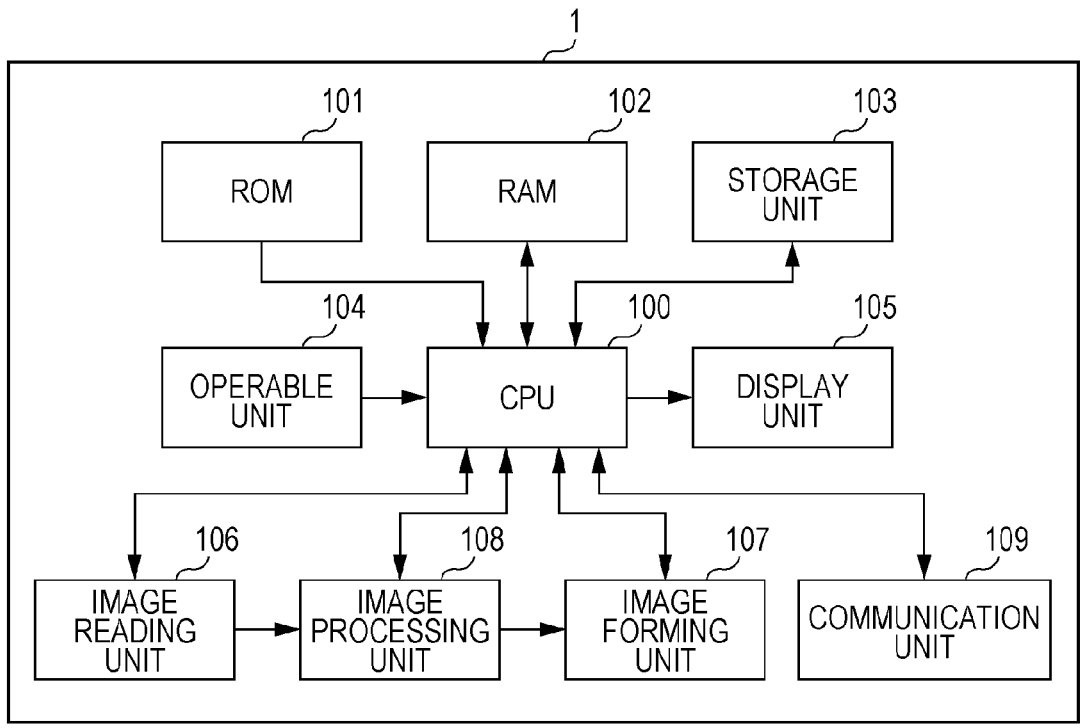
FIG. 1 is a block diagram illustrating a hardware configuration of an image forming apparatus according to an exemplary embodiment of the present invention.

FIG. 1 illustrates a hardware configuration of an image forming apparatus 1 according to an exemplary embodiment of the present invention. The image forming apparatus 1 is an example of an information processing apparatus according to an exemplary embodiment of the present invention. The image forming apparatus 1 includes, for example, an image forming function for forming an image onto a sheet in accordance with data transmitted from a computer device, such as a personal computer, a copying function for photocopying a document, and a scanning function for reading an image formed on a sheet and converting the image into data. The functions included in the image forming apparatus 1 are not limited to these functions, and a facsimile function may additionally be included. Furthermore, the image forming apparatus 1 is not limited to a type that includes all of the above functions, and may be of a type that includes, for example, the image forming function and the copying function but does not include other functions.

An operable unit 104 includes multiple buttons and a touchscreen used for operating the image forming apparatus 1. A display unit 105 that displays an image on the touchscreen includes a display device, such as a liquid crystal display or an organic electro-luminescence (EL) display.

A communication unit 109 is connected to a communication line and performs data communication with another device connected to the communication line. Examples of the communication line include a telephone line and a local area network (LAN). The communication unit 109 acquires, from another device, image data indicating an image to be formed onto a sheet. The image data acquired by the communication unit 109 is supplied to an image processing unit 108 by a central processing unit (CPU) 100.

An image reading unit 106 includes an image reader (not shown) that optically reads a document and generates image data indicating the read document image. The image reading unit 106 outputs the generated image data to the image processing unit 108. The image processing unit 108 is configured to perform various kinds of processing on the supplied image data. The image processing unit 108 performs image processing, such as color correction and gradation correction, on the image indicated by the supplied image data, generates image data of yellow (Y), magenta (M), cyan (C), and black (K) images from the image-processed image, and outputs the generated image data to an image forming unit 107.

The image forming unit 107 forms toner images onto a sheet by electrophotography. Specifically, the image forming unit 107 includes an image forming section that forms a yellow toner image, an image forming section that forms a magenta toner image, an image forming section that forms a cyan toner image, and an image forming section that forms a black toner image. The image forming sections form electrostatic latent images onto a photoconductor in accordance with the image data output from the image processing unit 108, subsequently form Y, M, C, and K toner images onto the photoconductor surface by adhering toners thereto, and then transfer the toner images onto the sheet. After the toner images transferred on the sheet are fixed thereto by applying heat and pressure thereto, the sheet having the toner images formed thereon is discharged outward from the image forming apparatus 1. Although an image is formed onto a sheet by using toner in this exemplary embodiment, a configuration that forms an image onto a sheet by using ink, such as an inkjet type, is also permissible. Furthermore, a medium onto which an image is to be formed is not limited to paper and may alternatively be a transparent plastic sheet, such as a sheet for an overhead projector (OHP).

A storage unit 103 has a storage device (e.g., a hard disk device) that permanently stores data, and stores a kernel program of an operating system, programs for various types of drivers, such as device drivers, and application programs that realize various kinds of functions of the image forming apparatus 1. These programs are examples of a second boot unit.

Although the program for the operating system is described as being an open source as an example in this exemplary embodiment, the program for the operating system is not limited to an open source and may alternatively be a closed source.

A read-only memory (ROM) 101 stores a boot loader as an example of a first boot unit. Furthermore, the ROM 101 stores image data of an image (i.e., a so-called splash screen) to be displayed during booting of the image forming apparatus 1. The ROM 101 is an example of a first memory that permanently stores the image data (image information) of the splash screen. A random access memory (RAM) 102 is a memory to be used by the CPU 100. The RAM 102 is an example of a second memory into which the image data of the splash screen is to be written.

When the image forming apparatus 1 is turned on, the CPU 100 boots the boot loader in the ROM 101. The CPU 100 having booted the boot loader boots the kernel program of the operating system, the programs for the various types of drivers, and the various application programs so as to control each unit of the image forming apparatus 1. When the CPU 100 boots the various kinds of programs, for example, the image forming function, the copying function, and the scanning function described above are realized. Furthermore, in the CPU 100 having booted the programs, a function for displaying the splash screen is realized.

Functional Configuration of Image Forming Apparatus 1

Figure 2:
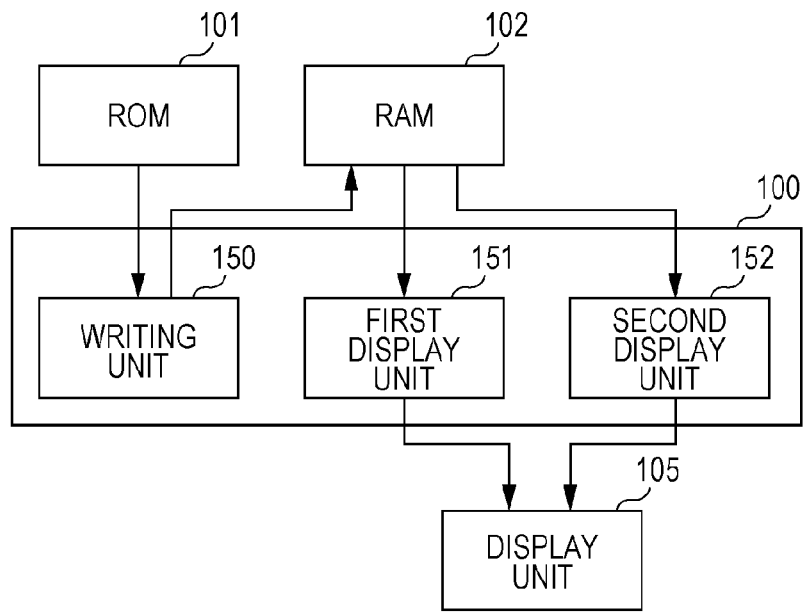
FIG. 2 is a block diagram illustrating a functional configuration of the image forming apparatus.

FIG. 2 is a functional block diagram illustrating the configuration of characteristic functions according to the exemplary embodiment of the present invention, which are included in the functions realized in the image forming apparatus 1.

In this exemplary embodiment, a writing unit 150 serves an example of a boot loader. The writing unit 150 writes the image data of the splash screen stored in the ROM 101 into a predetermined region of the RAM 102.

In this exemplary embodiment, a first display unit 151 serves an example of a boot loader. The first display unit 151 is an example of a first image display according to an exemplary embodiment of the present invention. The first display unit 151 controls the display unit 105 such that the image data of the splash screen written in the RAM 102 is displayed before the operating system is booted.

In this exemplary embodiment, a second display unit 152 serves as an example of a driver that operates in the operating system. The second display unit 152 is an example of a second image display according to an exemplary embodiment of the present invention. The second display unit 152 controls the display unit 105 such that an image-processed image obtained by performing image processing, to be described later, on the image data of the splash screen written in the RAM 102 is displayed after the booting of the operating system commences.

Operational Example According to Exemplary Embodiment

Next, an operational example according to this exemplary embodiment will be described with reference to a flowchart in FIG. 3. First, in step S1, when the image forming apparatus 1 is turned on, the CPU 100 reads the boot loader from the ROM 101 and boots the read boot loader. The CPU 100 having booted the boot loader initializes the CPU 100 itself as well as the RAM 102.

In step S2, the CPU 100 having booted the boot loader reads the image data of the splash screen from the ROM 101 and writes the read image data into the RAM 102. A region in the RAM 102 where the image data of the splash screen is to be written is written in a program for the boot loader and is a predetermined region.

When the image-data writing process is completed, the CPU 100 controls the display unit 105 in step S3 based on the image data of the splash screen written in the RAM 102. Consequently, the image of the splash screen is displayed on the display unit 105. In this exemplary embodiment, the image of the splash screen includes the name of the company that has manufactured the image forming apparatus 1 so as to indicate the manufacturing company.

In step S4, the CPU 100 having booted the boot loader reads the kernel program of the operating system from the storage unit 103 and boots the read kernel program. In step S5, the CPU 100 having booted the kernel reads the programs for the various types of drivers and boots the read programs.

The programs for the multiple drivers booted by the CPU 100 include a program for a driver that displays the image of the splash screen. In the program for this driver, an address of the region in the RAM 102 where the image data of the splash screen is to be written by the boot loader is preliminarily written.

In step S6, the CPU 100 having booted the driver that displays the image of the splash screen acquires the image data of the splash screen from the region where the image data of the splash screen is written, and controls the display unit 105 based on the acquired image data. Thus, the image of the splash screen is displayed on the display unit 105. When the CPU 100 controls the display unit 105, if the color depth of the image of the splash screen expected by the driver is different from the color depth of the image of the splash screen displayed by the boot loader, the CPU 100 performs image processing on the read image data and controls the display unit 105 based on the image-processed image data. An example of image processing in this case includes image processing performed when the bit number of the image data handled by the boot loader is different from the bit number of the image data handled by the driver. For example, the following description relates to a case where the bit number of the image data handled by the boot loader is 16 bits, the bit number of the image data handled by the driver is 24 bits, and the bit number of the image data of the splash screen is 16 bits. When the image data of the splash screen is displayed in 16 bits, the boot loader directly uses the image data of the splash screen to perform control for displaying the image, whereas the driver performs bit-shifting on the image data of the splash screen from 16 bits to 24 bits to perform control for displaying the image so that the image appears to be the same. In other words, the driver is an example of an image processing unit that performs image processing. Although the above description relates to a case where the bit number of the image data of the splash screen is 16 bits, this image data may be 24-bit image data that may be handled by the driver. In that case, the boot loader performs bit-shifting before it reads the image data so as to convert the 24-bit image data into 16-bit image data.

The bit-shifting mentioned above is an example of image processing. Alternatively, for example, the conversion between the 16-bit image data and the 24-bit image data may be performed by using a look-up table (LUT) so as to compensate for a difference in colors caused by different bit numbers. Moreover, bit-width conversion using the LUT is also an example of color-correction processing performed on image data.

Subsequently, in step S7, the CPU 100 boots the various types of drivers and the various application programs. When the image forming apparatus 1 becomes usable by the user, the CPU 100 deletes the image of the splash screen by controlling the display unit 105 in step S8, and then controls the display unit 105 in step S9 so that a menu screen having a graphical user interface (GUI) for operating the image forming apparatus 1 is displayed. In the image forming apparatus 1, when the user operates the touchscreen displaying the menu screen thereon, the CPU 100 controls each unit in accordance with the operation performed by the user so as to perform processing in accordance with the operation performed by the user.

According to this exemplary embodiment, the address of the region in the ROM 101 where the image data of the splash screen is written is not written in the program for the driver, but the address of the region in the RAM 102 where the image data of the splash screen is written is written in the program for the driver. Therefore, even if the source of the driver, which is an open source, is analyzed, the address of the region in the ROM 101 where the image data of the splash screen is stored is not obtainable. This may make it difficult to illegally rewrite the image data of the splash screen stored in the ROM 101, thus making it difficult to disguise oneself as the manufacturing company of the image forming apparatus 1 by rewriting the image of the splash screen.

Modifications

Although the exemplary embodiment of the present invention has been described above, the present invention is not limited to the above-described exemplary embodiment and permits other various exemplary embodiments. For example, the above-described exemplary embodiment may be modified as follows. Moreover, the above-described exemplary embodiment and the following modifications may be combined.

In the above-described exemplary embodiment, the information processing apparatus that displays the image of the splash screen is the image forming apparatus 1, but is not limited to the image forming apparatus 1. For example, other apparatuses, such as a portable telephone, a digital camera, a digital television set, a car navigation apparatus, an apparatus equipped with a touchscreen, are permissible so long as the apparatus includes a boot loader and an operating system.

Although the image data of the splash screen is preliminarily stored in the ROM 101 in the above-described exemplary embodiment, the image data of the splash screen may alternatively be stored in the storage unit 103.

In the above-described exemplary embodiment, the image data of the splash screen is written into the RAM 102 by the boot loader after the boot loader is booted. Alternatively, the image data of the splash screen may be written into a predetermined region of the storage unit 103, and the CPU 100 may read the image data of the splash screen from the storage unit 103.

In the above-described exemplary embodiment, image processing is performed so that the color depth of the splash screen displayed by the boot loader and the color depth of the splash screen displayed by the driver are made equal to each other. Alternatively, without performing image processing, the color depth of the splash screen displayed by the boot loader and the color depth of the splash screen displayed by the driver may be different from each other.

The various kinds of programs described above may be stored in and provided by a computer readable storage medium, such as a magnetic storage medium (magnetic tape, a magnetic disk (hard disk drive (HDD)), or a flexible disk (FD)), an optical storage medium (such as an optical disk), a magneto-optical storage medium, or a semiconductor memory, and be installed into the image forming apparatus 1. Alternatively, the various kinds of programs described above may be downloaded into the image forming apparatus 1 via a communication line and be installed therein.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one hardware processor configured to execute modules comprising:
a first memory configured to store image information;
a first boot unit configured to boot the information processing apparatus and store a copy of the image information in a predetermined region of a second memory;
a first image display configured to perform first image display while the first boot unit boots the information processing apparatus based on the image information stored in the first memory;
a second boot unit configured to boot the information processing apparatus;
an image processing unit configured to read the copy of the image information from the predetermined region of the second memory and generate processed image information by performing processing on the copy of the image information from the predetermined region of the second memory, in response to the second boot unit booting the information processing apparatus; and
a second image display configured to perform second image display while the second boot unit boots the information processing apparatus based on the processed image information.

2. The information processing apparatus according to claim 1,
wherein the image processing unit is configured to generate the processed image information by performing bit-width conversion on the image information stored in the second memory.

3. A non-transitory computer readable medium storing a program causing a computer to execute a process for processing information, the process comprising:
storing image information in a first memory;
performing first booting for booting an information processing apparatus and storing a copy of the image information in a predetermined region of a second memory;
performing first image display while the first booting is performed based on the image information stored in the first memory;
performing second booting for booting the information processing apparatus;
reading the copy of the image information from the predetermined region of the second memory and generating processed image information by performing processing on the copy of the image information from the predetermined region of the second memory, in response to the second booting of the information processing apparatus; and performing second image display while the second booting is performed based on the processed image information.

4. An information processing method comprising:

storing image information in a first memory;

performing first booting for booting an information processing apparatus and storing a copy of the image information in a predetermined region of a second memory;

performing first image display while the first booting is performed based on the image information stored in the first memory;

performing second booting for booting the information processing apparatus;

reading the copy of the image information from the predetermined region of the second memory and generating processed image information by performing processing on the copy of the image information from the predetermined region of the second memory, in response to the second booting of the information processing apparatus; and performing second image display while the second booting is performed based on the processed image information.

* * * * *